(12) United States Patent
Park et al.

(10) Patent No.: US 11,949,077 B2
(45) Date of Patent: *Apr. 2, 2024

(54) BATTERY MODULE

(71) Applicant: Samsung SDI Co., Ltd., Yongin-si (KR)

(72) Inventors: Juyong Park, Yongin-si (KR); Heonhee Kim, Yongin-si (KR); Dongjin Park, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/342,167

(22) PCT Filed: Apr. 13, 2017

(86) PCT No.: PCT/KR2017/003999
§ 371 (c)(1),
(2) Date: Apr. 15, 2019

(87) PCT Pub. No.: WO2018/074686
PCT Pub. Date: Apr. 26, 2018

(65) Prior Publication Data
US 2019/0237828 A1 Aug. 1, 2019

(30) Foreign Application Priority Data
Oct. 17, 2016 (KR) .................. 10-2016-0134551

(51) Int. Cl.
*H01M 10/38* (2006.01)
*H01M 10/613* (2014.01)
(Continued)

(52) U.S. Cl.
CPC ..... *H01M 10/613* (2015.04); *H01M 10/6552* (2015.04); *H01M 10/6554* (2015.04); *H01M 10/6556* (2015.04); *H01M 50/271* (2021.01)

(58) Field of Classification Search
CPC ........... H01M 10/613; H01M 10/6552; H01M 10/6554; H01M 10/6556; H01M 2/10; H01M 2/1072; H01M 50/20
See application file for complete search history.

(56) References Cited

U.S. PATENT DOCUMENTS 8,974,934 B2    3/2015  Merriman et al.
9,159,973 B2*  10/2015  Harada ............... H01M 10/651
(Continued)

FOREIGN PATENT DOCUMENTS

CN        1410695 A    4/2003
CN     102563248 A    7/2012
(Continued)

OTHER PUBLICATIONS

Written Opinion for corresponding International Application No. PCT/KR2017/003999, dated Jul. 17, 2017, 4pp.
(Continued)

*Primary Examiner* — Raymond Alejandro
(74) *Attorney, Agent, or Firm* — Lewis Roca Rothgerber Christie LLP

(57) ABSTRACT

Provided is a battery module. The battery module includes a first cooling tube, a second cooling tube connected to the first cooling tube and arranged on a different plane than the first cooling tube, and a branching portion connecting the first cooling tube to the second cooling tube, wherein the branching portion includes a lower connection tube connected to the first cooling tube, an upper connection tube connected to the second cooling tube, and a connection member into which one of the lower connection tube and the upper connection tube is inserted, the connection member being inserted into the other of the lower connection tube and the upper connection tube.

15 Claims, 9 Drawing Sheets

(51) Int. Cl.
*H01M 10/6552* (2014.01)
*H01M 10/6554* (2014.01)
*H01M 10/6556* (2014.01)
*H01M 50/271* (2021.01)

(56) References Cited

U.S. PATENT DOCUMENTS

| | | | |
|---|---|---|---|
| 9,676,291 | B2 | 6/2017 | Haussmann |
| 10,026,937 | B2 | 7/2018 | Kim et al. |
| 10,096,869 | B2 * | 10/2018 | Zheng ................. H01M 2/1077 |
| 10,411,316 | B2 * | 9/2019 | Hayashi ............ H01M 10/0413 |
| 2003/0057701 | A1 | 3/2003 | Koo |
| 2012/0146329 | A1 | 6/2012 | McAven |
| 2012/0175873 | A1 | 7/2012 | Kim |
| 2014/0162107 | A1 | 6/2014 | Obrist et al. |
| 2016/0036102 | A1 | 2/2016 | Suzuki et al. |
| 2016/0258561 | A1 | 9/2016 | Hiroi |
| 2016/0273688 | A1 | 9/2016 | Considine, Jr. et al. |
| 2018/0241102 | A1 | 8/2018 | Kim et al. |
| 2019/0237828 | A1 | 8/2019 | Park et al. |
| 2019/0319318 | A1 | 10/2019 | Park |

FOREIGN PATENT DOCUMENTS

| | | |
|---|---|---|
| CN | 102589056 A | 7/2012 |
| CN | 204312910 U | 5/2015 |
| CN | 104756279 A | 7/2015 |
| CN | 105299347 A | 2/2016 |
| CN | 105359330 A | 2/2016 |
| CN | 205402044 U | 7/2016 |
| CN | 106299541 A | 1/2017 |
| CN | 109804498 A | 5/2019 |
| DE | 102014200174 A1 | 7/2015 |
| EP | 2602859 A1 | 6/2013 |
| EP | 2610947 A2 | 7/2013 |
| JP | 2001-295968 A | 10/2001 |
| JP | 2007-192270 A | 8/2007 |
| JP | 2015-96416 A | 5/2015 |
| JP | 2016-132314 A | 7/2016 |
| KR | 20-0420773 Y1 | 7/2006 |
| KR | 10-0785430 B1 | 12/2007 |
| KR | 20-0438887 Y1 | 3/2008 |
| KR | 10-2012-0062207 A | 6/2012 |
| KR | 10-2012-0096133 A | 8/2012 |
| KR | 10-1195425 B1 | 10/2012 |
| KR | 10-2013-0064969 A | 6/2013 |
| KR | 10-2013-0113740 A | 10/2013 |
| KR | 10-2015-0043337 A | 4/2015 |
| KR | 10-2015-0050449 A | 5/2015 |
| KR | 10-2015-0072991 A | 6/2015 |
| KR | 10-1568793 B1 | 11/2015 |
| KR | 10-2016-0027373 A | 3/2016 |
| WO | WO 2012/117697 A1 | 9/2012 |

OTHER PUBLICATIONS

International Search Report for corresponding International Application No. PCT/KR2017/003999, dated Jul. 17, 2017, 3pp.
Written Opinion for corresponding International Application No. PCT/KR2017/010101, dated Dec. 22, 2017, 5 pages.
International Search Report for corresponding International Application No. PCT/KR2017/010101 dated Dec. 22, 2017, 5 pages.
EPO Extended Search Report dated Apr. 30, 2020 for corresponding European Patent Application No. 17859628.4, 9 pages.
U.S. Office Action dated Nov. 9, 2020, issued in U.S. Appl. No. 16/341,004, 18 pages.
Choi et al; "Battery cell of heat sink unit", Google Patents Machine Translation (Year: 2013).
De Jesus; "Connecting Srtucture of Pipes", Google Patents Machine Translation (Year: 2015).
U.S. Office Action dated Jul. 2, 2021, issued in U.S. Appl. No. 16/341,004 (29 pages).
European Office action dated Jan. 28, 2021, issued in European Patent Application No. 17859628.4, 5 pages.
Korean Office action dated Jan. 27, 2021, issued in Korean Patent Application No. 10-2016-0132847, 4 pages.
U.S. Advisory Action dated May 18, 2021, issued in U.S. Appl. No. 16/341,004 (2 pages).
Korean Office Action dated Jan. 20, 2021, issued in corresponding Korean Patent Application No. 10-2016-0134551 (41 pages).
Chinese Office Action, with English translation, dated Jul. 6, 2021, issued in corresponding Chinese Patent Application No. 201780063713.4 (20 pages).
Chinese Office Action, with English translation, dated Jul. 15, 2021, issued in Chinese Patent Application No. 201780062146.0 (24 pages).
Korean Notice of Allowance dated Jul. 20, 2021, issued in corresponding Korean Patent Application No. 10-2016-0134551 (2 pages).
Korean Notice of Allowance dated Jul. 22, 2021, issued in Korean Patent Application No. 10-2016-0132847 (2 pages).
U.S. Final Office Action dated Dec. 7, 2021, issued in U.S. Appl. No. 16/341,004 (30 pages).
U.S. Advisory Action from U.S. Appl. No. 16/341,004, dated Feb. 15, 2022, 3 pages.
Sun et al; "CN 106299541A Power battery pack liquid cooling system"; Machine translation of CN 106299541 A obtained from Espacenet (Year: 2017).
O Jes et al; "KR1015687930000*—Pipe ConnectingStructure"; Machine translation of KR 101568793 B1 obtained from WIPO IP Portal (Year: 2015).
Koller et al; "Description DE10201420017 4A 1 "; Machine translation of DE-10201420017 4-A 1 by Espacenet Patent Translate (Year: 2014).
U.S. Office Action dated May 24, 2022, issued in U.S. Appl. No. 16/341,004 (35 pages).
U.S. Office Action dated Nov. 8, 2022, issued in U.S. Appl. No. 16/341,004 (29 pages).

* cited by examiner

BATTERY MODULE

CROSS-REFERENCE TO RELATED APPLICATION(S)

This application is a National Phase Patent Application of International Patent Application Number PCT/KR2017/003999, filed on Apr. 13, 2017, which claims priority of Korean Patent Application No. 10-2016-0134551, filed Oct. 17, 2016. The entire contents of both of which are incorporated herein by reference.

TECHNICAL FIELD

The present disclosure relates to a battery module.

BACKGROUND ART

In general, a secondary battery is rechargeable and dischargeable unlike a primary battery that may not be recharged. A secondary battery is used as an energy source in mobile devices, electric vehicles, hybrid vehicles, electric bicycles, and uninterruptible power supplies, and may be in the form of a single battery or a battery module in which a plurality of batteries are electrically connected as a single unit, depending on the kinds of external devices to which the secondary battery is applied.

DESCRIPTION OF EMBODIMENTS

Technical Problem

A small-sized mobile device such as a mobile phone is operable using the output and capacity of a single battery, but electronic vehicles or hybrid vehicles consume a relatively large amount of electric power to drive with high electric power for a long time, and thus employ a module type including a plurality of batteries. In addition, an output voltage or an output current may increase according to the number of batteries included in the module.

Solution to Problem

Embodiments of the present disclosure provide battery modules.

An aspect of the present disclosure may provide a battery module including: a first cooling tube, a second cooling tube connected to the first cooling tube and arranged on a different plane than the first cooling tube, and a branching portion connecting the first cooling tube to the second cooling tube, wherein the branching portion includes a lower connection tube connected to the first cooling tube, an upper connection tube connected to the second cooling tube, and a connection member into which one of the lower connection tube and the upper connection tube is inserted, the connection member being inserted into the other of the lower connection tube and the upper connection tube.

Advantageous Effects of Disclosure

According to embodiments of the present disclosure, cooling tubes of a battery module, arranged on different planes, may be simply connected to each other through a connection member. In addition, when the cooling tubes arranged on different planes are connected to each other through the connection member, the cooling tubes may be sealed to thereby prevent the battery module from failing or being damaged due to a leakage, and the lifespan of the battery module may increase.

BEST MODE

Figure 1:
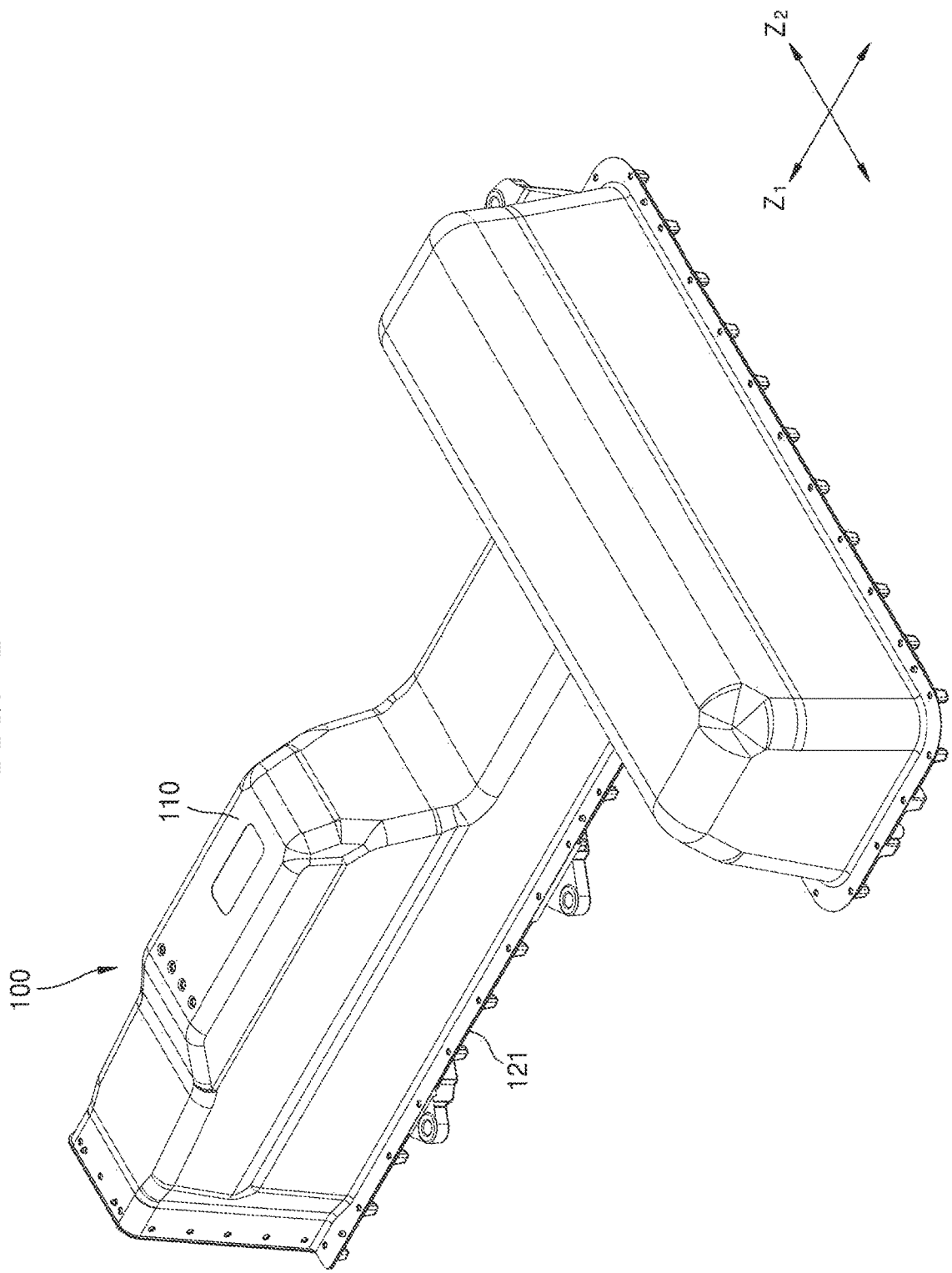
FIG. 1 is a perspective view of a battery module according to an embodiment of the present disclosure.

An aspect of the present disclosure may provide a battery module including: a first cooling tube, a second cooling tube connected to the first cooling tube and arranged on a different plane than the first cooling tube, and a branching portion connecting the first cooling tube to the second cooling tube, wherein the branching portion includes: a lower connection tube connected to the first cooling tube, an upper connection tube connected to the second cooling tube, and a connection member into which one of the lower connection tube and the upper connection tube is inserted, the connection member being inserted into the other of the lower connection tube and the upper connection tube.

The connection member may include a protrusion protruding toward the lower connection tube or the upper connection tube.

The protrusion may include: an outer protrusion protruding toward one of the lower connection tube and the upper connection tube, and an inner protrusion protruding toward the other of the lower connection tube and the upper connection tube.

The protrusion may include a plurality of protrusions, wherein the plurality of protrusions may be spaced apart from each other.

The protrusion may encircle an outer surface of the connection member to form a closed loop.

The connection member may include: a core member, and an outer cover member surrounding an outer surface of the core member.

Hardness of the core member may be different from hardness of the outer cover member.

The connection member may include: a seating portion supporting an end of one of the lower connection tube and the upper connection tube, and a latching portion latched to an end of the other of the lower connection tube and the upper connection tube.

The battery module may further include a lower branching block arranged between the first cooling tube and the lower connection tube.

The battery module may further include an upper branching block arranged between the second cooling tube and the upper connection tube.

The battery module may further include a first cooling plate in which the first cooling tube is arranged.

The battery module may further include a second cooling plate in which the second cooling tube is arranged.

The connection member may be tightly coupled with the lower connection tube or the upper connection tube.

The battery module may further include a third cooling tube connected to the first cooling tube and arranged on a different plane than the first cooling tube to form a certain angle with the first cooling tube.

The battery module may further include a third cooling plate in which the third cooling tube is arranged.

Mode of Disclosure

The present disclosure will be more apparent from embodiments described below in detail with reference to the accompanying drawings. The embodiments may, however, have different forms and should not be construed as being limited to the descriptions set forth herein. Rather, these embodiments are provided so that this disclosure will be thorough and complete, and will fully convey the scope of the present disclosure to those skilled in the art. Therefore, the scope of the present disclosure should be defined by the claims. In the following description, technical terms are used only for explaining example embodiments, and not for purposes of limitation. The terms of a singular form may include plural forms unless specifically mentioned. The meaning of 'comprises' and/or 'comprising' specifies an element, a step, an operation, and/or a device but does not exclude other elements, steps, operations, and/or devices. It will be understood that although the terms "first," "second," etc. may be used herein to describe various elements, these elements should not be limited by these terms. These terms are only used to distinguish one element from another.

FIG. 1 is a perspective view of a battery module 100 according to an embodiment of the present disclosure.

Referring to FIG. 1, the battery module 100 may include a first cooling plate 121 arranged on the bottom of the battery module 100 and a plurality of battery packs arranged on the first cooling plate 121, and may further include a cover 110 installed to face the first cooling plate 121 to form an accommodation space for the battery packs and for protecting the plurality of battery packs from an external environment. The first cooling plate 121 and the cover 110 may be formed in the same shape so as to be assembled facing each other, for example, a T shape extending a first direction Z1 and a second direction Z2, which are different from each other.

Figure 2:
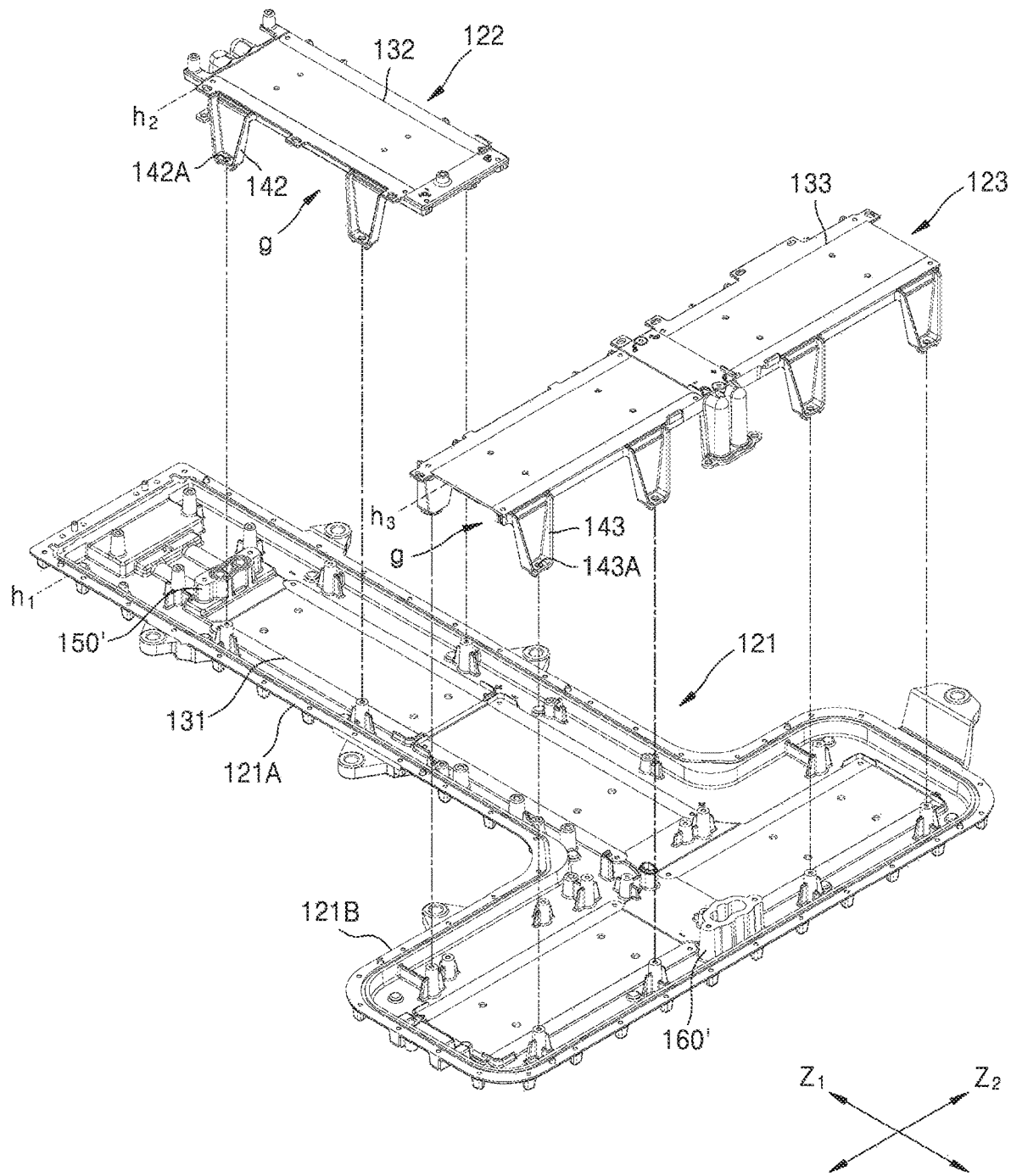
FIG. 2 is an exploded perspective view of the internal structure of the battery module shown in FIG. 1.
Figure 3:
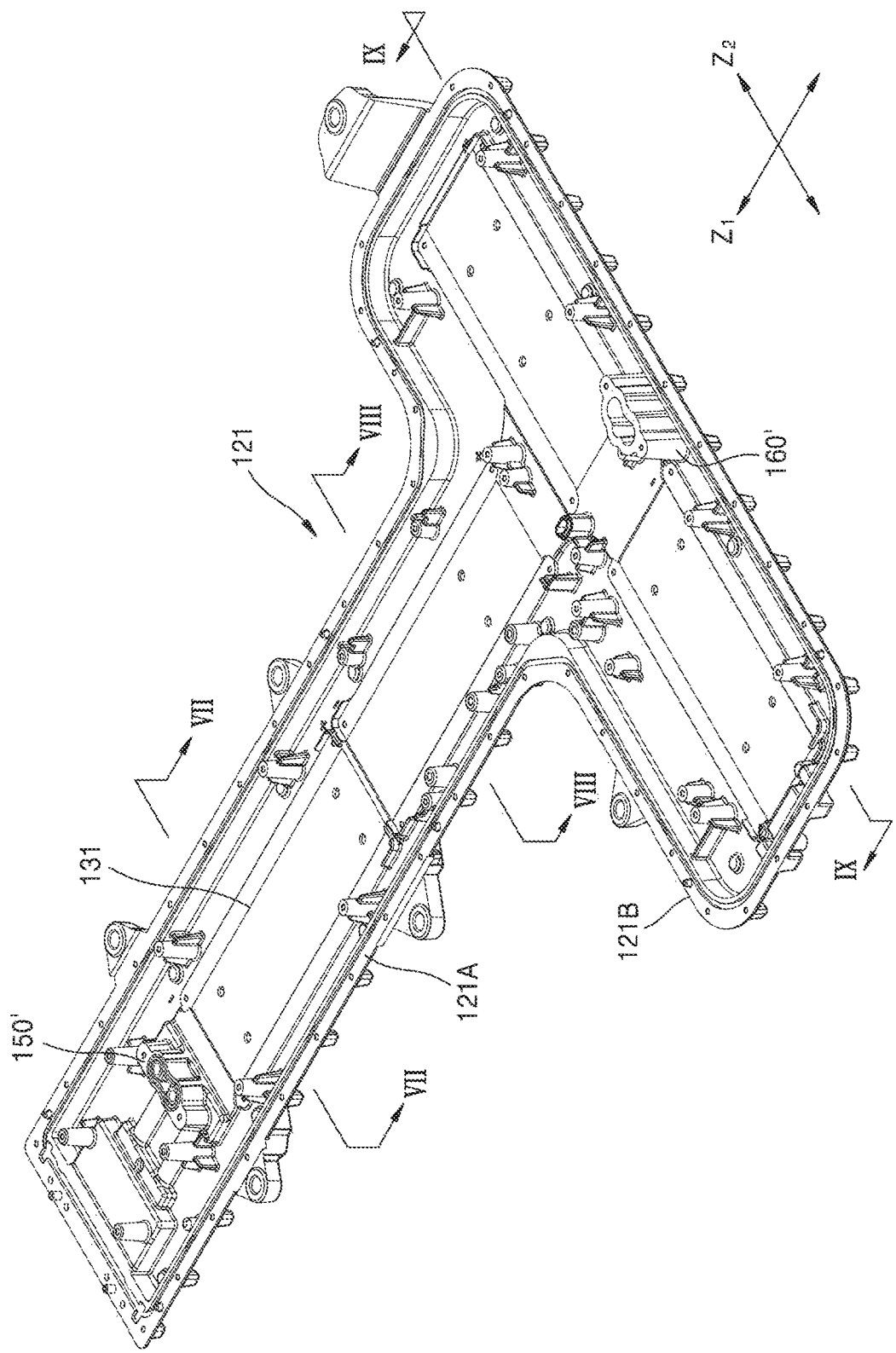
FIG. 3 is a perspective view of a first cooling plate shown in FIG. 2.
Figure 4:
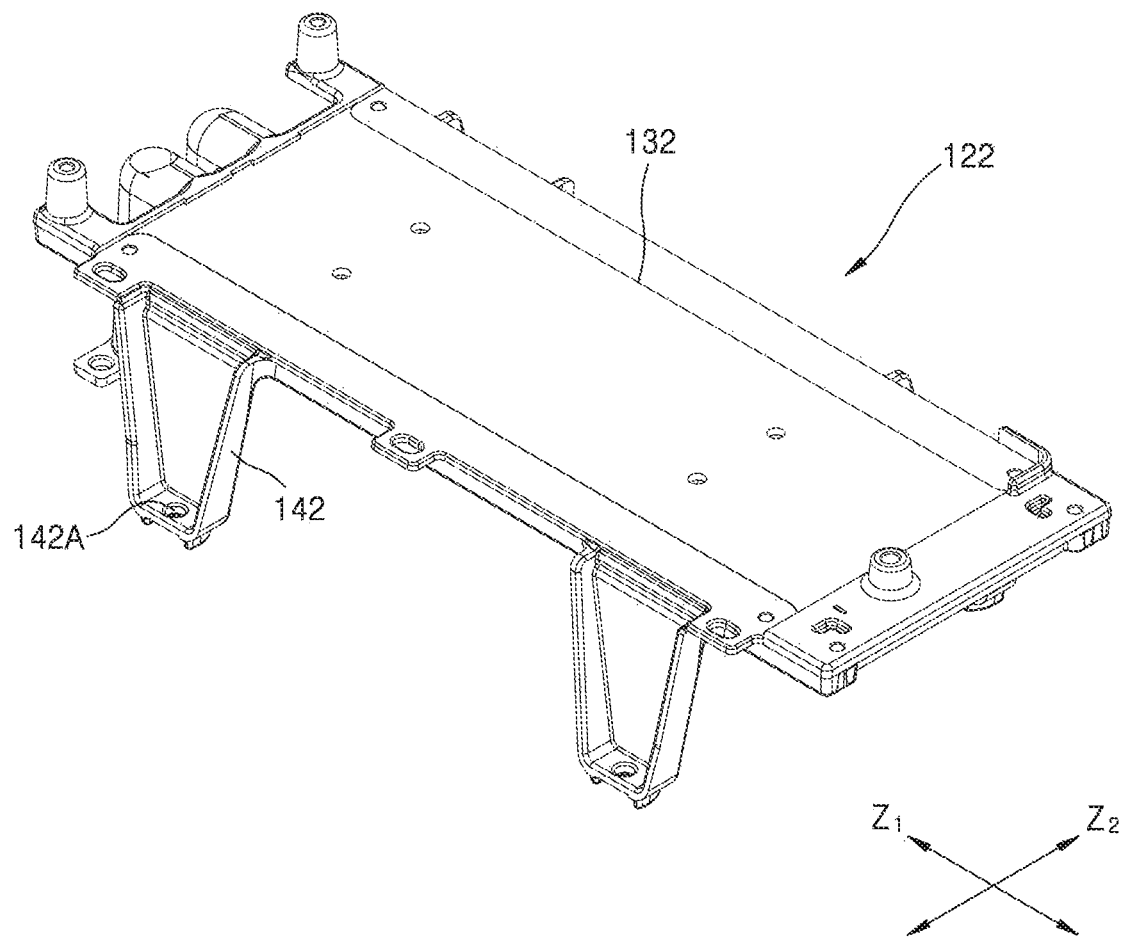
FIG. 4 is a perspective view of a second cooling plate shown in FIG. 2.
Figure 5:
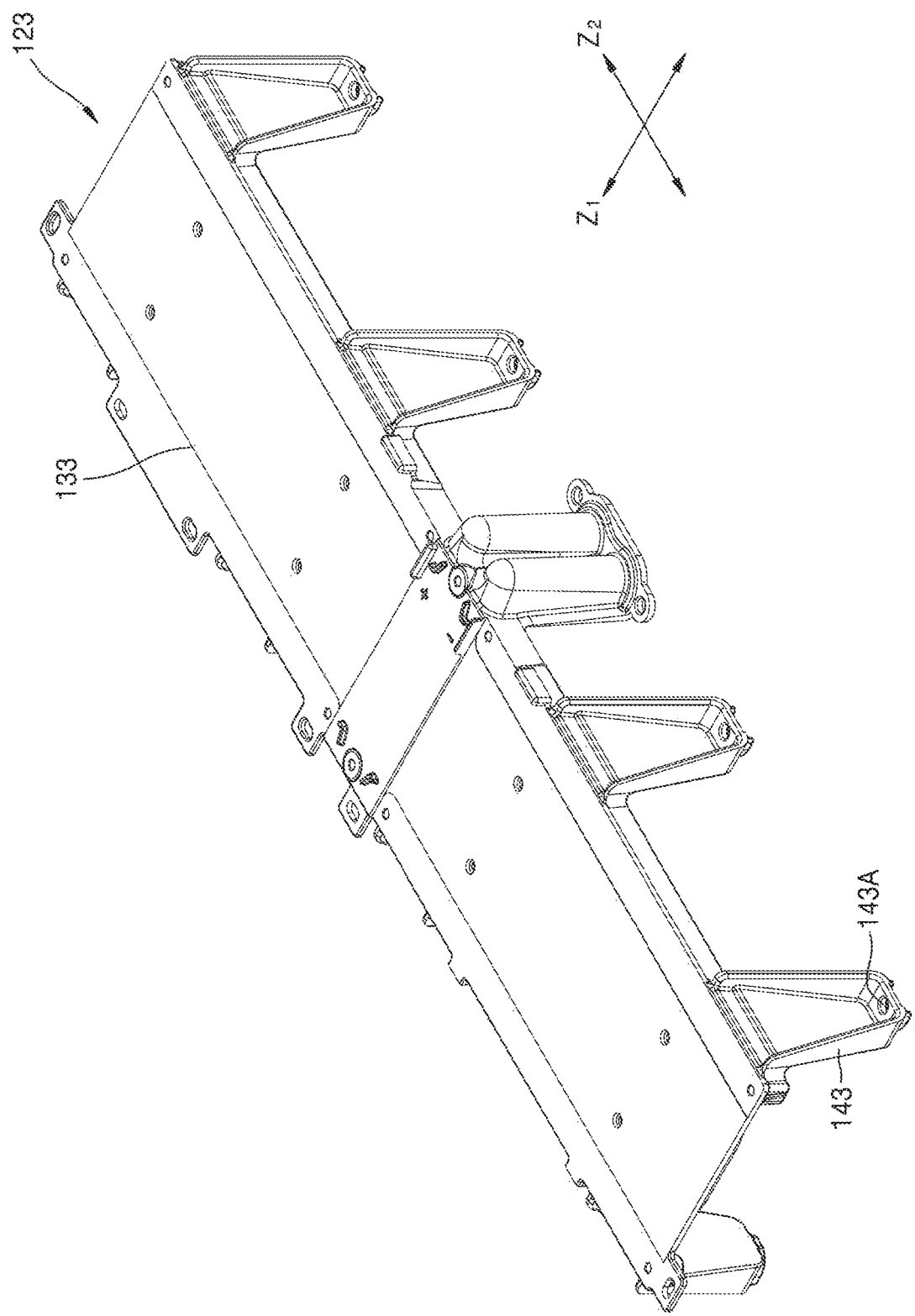
FIG. 5 is a perspective view of a third cooling plate shown in FIG. 2.

FIG. 2 is an exploded perspective view of the internal structure of the battery module 100 shown in FIG. 1. FIGS. 3 to 5 are perspective views of first to third cooling plates 121, 122, and 123 shown in FIG. 2.

Referring to FIGS. 2 to 5, the second cooling plate 122 spaced apart from the first cooling plate 121 with a pack accommodation portion g therebetween and the third cooling plate 123 spaced apart from the first cooling plate 121 with the pack accommodation portion g therebetween may be arranged over the first cooling plate 121.

The first to third cooling plates 121, 122, and 123 may directly contact battery packs 131, 132, and 133, respectively, to dissipate heat from the battery packs 131, 132, and 133, and may dissipate the heat while also supporting the battery packs 131, 132, and 133. For example, the first cooling plate 121 may be arranged at a first level h1 corresponding to the bottom of the battery module 100 to support the battery pack 131 of a first group and may dissipate heat from the battery pack 131. The second cooling plate 122 may be arranged at a second level h2 spaced upward from the first level h1 to support the battery pack 132 of a second group and may dissipate heat from the battery pack 132. The third cooling plate 123 may be arranged at a third level h3 spaced upward from the first level h1 to support the battery pack 133 of a third group and may dissipate heat from the battery pack 133. For reference, the battery packs 131, 132, and 133 of the first to third groups are indicated by battery pack mounting points for ease of understanding in the drawings attached hereto.

The battery packs 131, 132 and 133 of the first to third groups may include one or more battery packs and may each include different numbers of battery packs. In an embodiment of the present disclosure, the battery pack 131 of the first group may be arranged at the first level h1 corresponding to the bottom of the battery module 100 and may include the largest number of battery packs, and the battery pack 132 of the second group may include the fewest number of battery packs. The number of battery packs included in the battery pack 133 of the third group may be lower than the number of battery packs 131 of the first group and greater than the number of battery packs 132 of the second group.

In an embodiment of the present disclosure, the battery pack 131 of the first group arranged on the first cooling plate 121 may include four battery packs. As described below, the first cooling plate 121 may include a longitudinal direction portion 121A extending in the first direction Z1 and a lateral direction portion 121B extending in the second direction Z2. Two battery packs may be arranged over the longitudinal direction portion 121A in the first direction Z1, and two battery packs may be arranged over the lateral direction portion 121B in the second direction Z2. The battery pack 132 of the second group arranged on the second cooling plate 122 may include two battery packs. The second cooling plate 122 may extend in the first direction Z1 and two battery packs may be arranged on the second cooling plate 122 in the first direction Z1 In addition, the battery pack 133 of the third group arranged on the third cooling plate 123 may include two battery packs. The third cooling plate 123 may extend in the second direction Z2 and two battery packs may be arranged on the third cooling plate 123 in the second direction Z2.

The first cooling plate 121 includes a longitudinal direction portion 121A extending in the first direction Z1 and a lateral direction portion 121B extending in the second direction Z2 that is different from the first direction Z1. For example, the longitudinal direction portion 121A and the lateral direction portion 121B may respectively extend in the first and second directions Z1 and Z2 perpendicular to each other. Accordingly, the first cooling plate 121 may have a T-shape as a whole.

The second cooling plate 122 may be formed over the longitudinal direction portion 121A of the first cooling plate 121 and spaced apart from the longitudinal direction portion 121A with the pack accommodation portion g therebetween. In this case, the longitudinal direction portion 121A of the first cooling plate 121 and the second cooling plate 122 may be parallel to each other in the first direction Z1. The third cooling plate 123 may be formed over the lateral direction portion 121B of the first cooling plate 121 and spaced apart from the lateral direction portion 121B with the pack receiving portion g therebetween. In this case, the lateral direction portion 121B of the first cooling plate 121 and the third cooling plate 123 may be parallel to each other in the second direction Z2. In this case, the second cooling plate 122 and the third cooling plate 123 may be spaced apart from each other.

The first cooling plate 121 may form the bottom of the entire battery module and provide the base of the entire battery module. That is, the second and third cooling plates 122 and 123 may be supported on the first cooling plate 121. To this end, the second and third cooling plates 122 and 123 may be provided with legs 142 and 143 for supporting the second and third cooling plates 122 and 123, respectively, at an upper position from the first cooling plate 121. That is, the legs 142 and 143 may be respectively formed between the first and second cooling plates 121 and 122 and between the first and third cooling plates 121 and 123 and support the second and third cooling plates 122 and 123 with the pack accommodation portion g therebetween from the first cooling plate 121. Coupling holes 142a and 143a may be formed in the legs 142 and 143 protruding from the second and third cooling plates 122 and 123, and the second and third cooling plates 122 and 123 may be fixed through a fastening member (not shown) that is inserted into the coupling holes 142a and 143a and fastened to the first cooling plate 121.

The cover 110 (see FIG. 1) may be covered on the first cooling plate 121 to which the second and third cooling plates 122 and 123 are fixed. The cover 110 may protect the battery packs 131, 132, and 133 of the first to third groups arranged on the first to third cooling plates 121, 122, and 123 from external environments. That is, the first cooling plate 121 and the cover 110 may be assembled to face each other, and an accommodation space in which the battery packs 131, 132, and 133 of the first to third groups are accommodated may be formed. The first cooling plate 121 and the cover 110 may be formed in the same shape, for example, a T shape, to be assembled to face each other.

Figure 6:
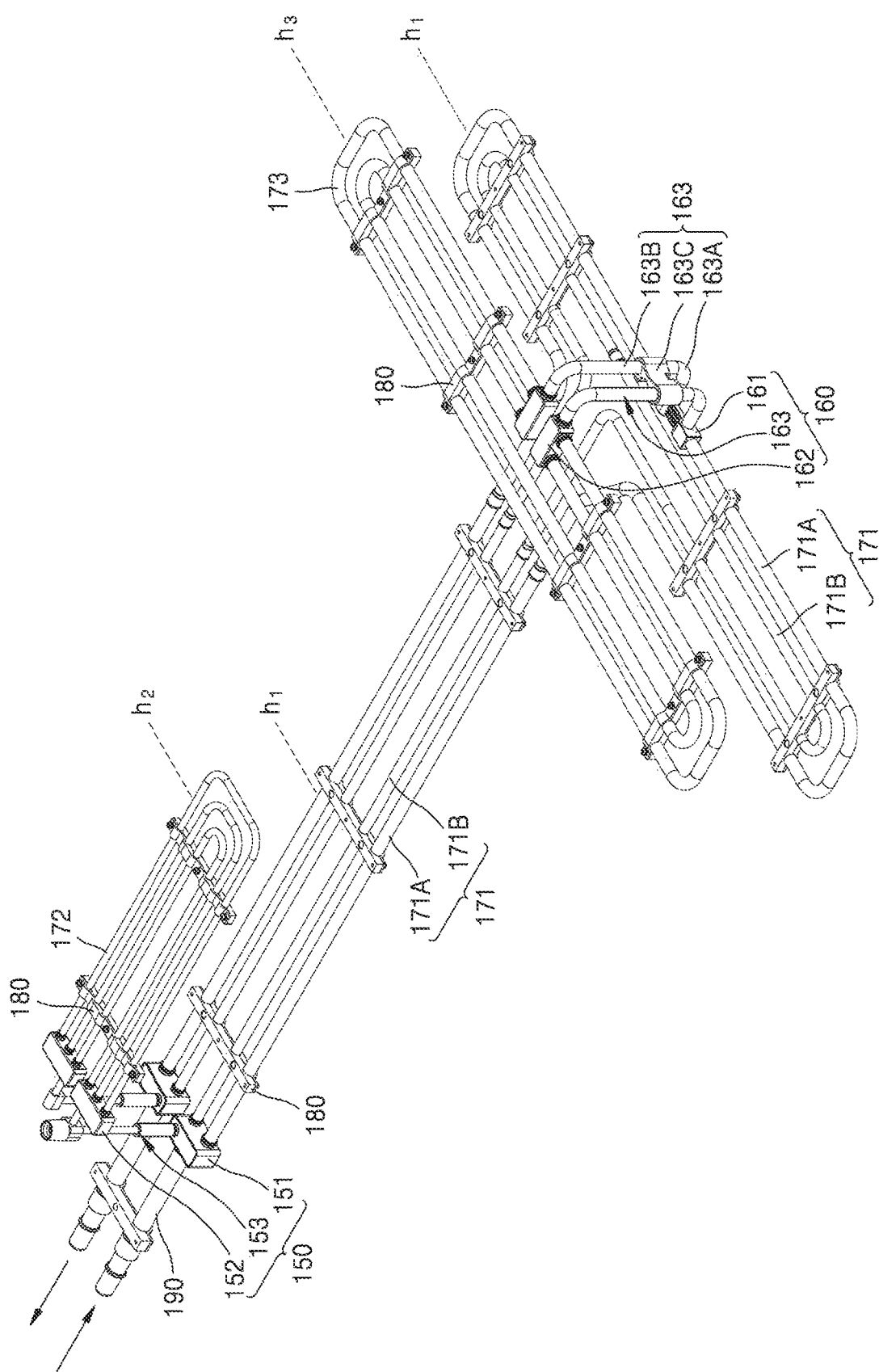
FIG. 6 is a perspective view showing first to third cooling tubes embedded in the first to third cooling plates shown in FIG. 2.
Figure 7:
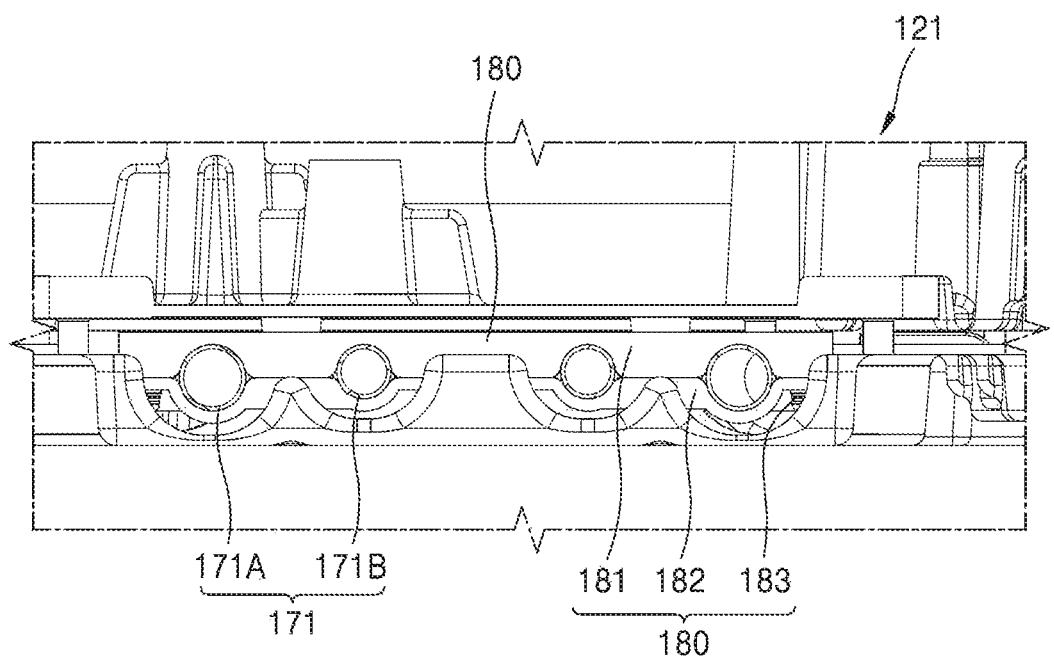
FIG. 7 is a cross-sectional view taken along line VII-VII in FIG. 3.
Figure 8:
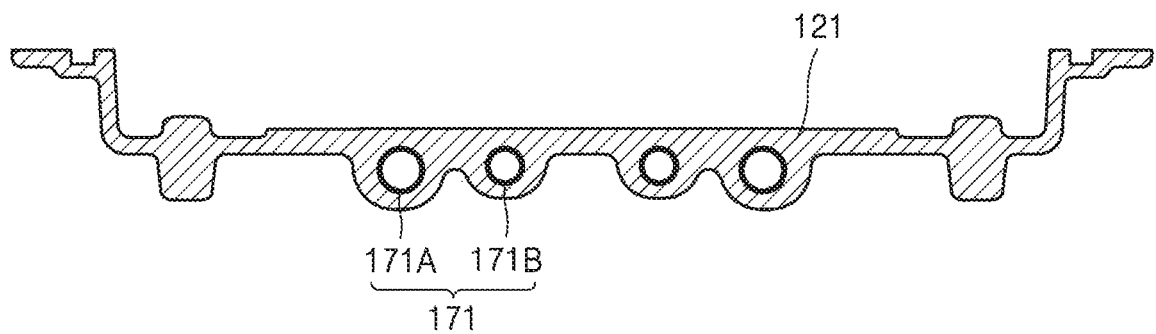
FIG. 8 is a cross-sectional view taken along line VIII-VIII in FIG. 3.

FIG. 6 is a perspective view showing first to third cooling tubes embedded in the first to third cooling plates 121, 122, and 123 shown in FIG. 2. FIG. 7 is a cross-sectional view taken along the line VII-VII in FIG. 3. FIG. 8 is a cross-sectional view taken along the line VIII-VIII in FIG. 3.

Referring to FIGS. 6 to 8, the first to third cooling plates 121, 122, and 123 may support the battery packs 131, 132, and 133 and may also thermally contact, for example, directly contact, the battery packs 131, 132, and 133 and dissipate heat from the battery packs 131, 132, and 133. To this end, the first to third cooling plates 121, 122, and 123 may be provided with first to third cooling tubes 171, 172, and 173. For example, the first to third cooling tubes 171, 172, and 173 may be embedded in the first to third cooling plates 121, 122 and 133. The first to third cooling tubes 171, 172, and 173 may be integrated with the first to third cooling plates 121, 122, and 123 while being embedded in the first to third cooling plates 121, 122, and 123.

The first to third cooling tubes 171, 172, and 173 may include dissimilar metal materials that are different from those of the first to third cooling plates 121, 122, and 123, and may be formed through die casting. For example, the first to third cooling plates 121, 122, and 123 may be formed in such a manner that molten metal for plate formation is injected into a mold (not shown) in which the first to third cooling tubes 171, 172, and 173 are fixed. In this way, the first to third cooling plates 121, 122, and 123, in which the first to third cooling tubes 171, 172, and 173 are integrally embedded, may be obtained. For example, the first to third cooling tubes 171, 172, and 173 and the first to third cooling plates 121, 122, and 123 may include different dissimilar metal materials. The first to third cooling tubes 171, 172, and 173 may include an SUS material having a relatively high melting point, and the first to third cooling plates 121, 122, and 123 may include an aluminum material having a relatively low melting point. For example, molten aluminum may be injected in the state where the first to third cooling tubes 171, 172, 173 of the SUS material are temporarily fixed in the mold (not shown), and the first to third cooling tubes 171, 172, and 173 may maintain a solid state and maintain a tubular body. The first to third cooling tubes 171, 172, and 173 and the first to third cooling plates 121, 122, and 123 for burying the first to third cooling tubes 171, 172, and 173 may include an SUS material and an aluminum material, which have excellent heat conduction characteristics and different melting points, in order to dissipate heat from the battery packs 131, 132, and 133 that thermally contact the first to third cooling plates 121, 122, and 123.

As described above, the first cooling tube 171 is embedded in the first cooling plate 121 and the second cooling tube 172 is embedded in the second cooling plate 122. In addition, the third cooling tube 173 may be embedded in the third cooling plate 123. Thus, the first cooling tube 171 may be arranged at the same level as the first cooling plate 121, that is, at the first level h1 corresponding to the bottom of the entire battery module, and the second cooling tube 172 may be arranged at the same level as the second cooling plate 122, that is, at the second level h2 raised from the bottom level of the entire battery module. In addition, the third cooling tube 173 may be arranged at the same level as the third cooling plate 123, that is, at the third level h3 raised from the bottom level of the entire battery module. In this case, the second level h2 of the second cooling tube 172 and the third level h3 of the third cooling tube 173 may correspond to the same level.

The first cooling tube 171 and the second cooling tube 172 or the first cooling tube 171 and the third cooling tube 173 may be connected to each other through a branching portion (not shown). For example, the first cooling tube 171 and the second cooling tube 172 may be connected to each other through a front branching portion 150. More specifically, as well as with the first and second cooling tubes 171 and 172, an external connection tube 190 may be connected to the front branching portion 150. A cooling medium flowing from the external connection tube 190 may be distributed to the first and second cooling tubes 171 and 172 through the front branching portion 150, and a cooling medium from the first and second cooling tubes 171 and 172 may be collected in the front branching portion 150 and discharged to the external connection tube 190. A low-temperature cooling medium introduced through the external connection tube 190 and the front branching portion 150 may be branched into the first and second cooling tubes 171 and 172 and perform heat exchange with the battery packs of the first and second groups. The cooling medium heated to a high temperature through the heat exchange may be collected in the front branching portion 150 and then discharged through the external connection tube 190 connected to the front branching portion 150.

As described below, the cooling medium flowing through the first cooling tube 171 may be branched into the third cooling tube 173 through a rear branching portion 160. That is, a portion of the cooling medium flowing into the first cooling tube 171 through the front branching portion 150 may return to the front branching portion 150 via a bypass flow path 171B after dissipating heat from the battery pack 131 of the first group, and the other portion of the cooling medium flowing into the first cooling tube 171 may flow into the third cooling tube 173 through the rear branching portion 160.

The front branching portion 150 may be formed at a front position in the entire battery module and the rear branching portion 160 may be formed at a rear position in the entire battery module. Reference numeral 150' in FIG. 2 and reference numeral 150 in FIG. 6 denote front branching portions, but different reference numerals are given since only a portion (lower portion) of a front branching portion is shown in FIG. 2. Similarly, reference numeral 160' in FIG. 2 and reference numeral 160 in FIG. 6 denote rear branching portions, but different reference numerals are given since only a portion (lower portion) of a rear branching portion is shown in FIG. 2.

The first cooling tube 171 and the third cooling tube 173 may be connected to each other through the rear branching portion 160. The cooling medium of the first cooling tube 171 may flow into the third cooling tube 173 through the rear branching portion 160 and may return to the first cooling tube 171 through the rear branching portion 160 after dissipating heat from the battery pack 133 of the third group. For example, a portion of the cooling medium flowing through the first cooling tube 171 may bypass the rear branching portion 160 via the bypass flow path 171B without passing through the rear branching portion 160 after dissipating only heat from the battery pack 131 of the first group, and the other portion of the cooling medium flowing through the first cooling tube 171 may dissipate heat from the battery pack 131 of the first group and dissipate heat from the battery pack 133 of the third group through the rear branching portion 160. As described above, the bypass flow path 171B and a flow path 171A passing through the rear branching portion 160 are formed in parallel along a flow path of the first cooling tube 171, and a start point and an end point of the bypass flow path 171B are separate from a start point and an end point of the flow path 171A of the rear branching portion 160 at the front branching portion 150 along a circulation path of the first cooling tube 171.

By forming the bypass flow path 171B along the flow path of the first cooling tube 171, the heat dissipation of the battery pack 131 of the first group including the largest number of battery packs may be efficiently performed. For example, a cooling medium flowing through the bypass flow path 171B may maintain a somewhat low temperature and may efficiently cool the battery pack 131 of the first group even in the process of returning to the front branching portion 150.

The battery packs 131, 132, and 133 of the first to third groups may be dispersedly arranged on the first to third cooling plates 121, 122, and 123 arranged at different positions. In order to uniformly dissipate heat from the battery packs 131, 132, and 133 of the first to third groups dispersedly arranged in a plurality of positions, the first to third cooling tubes 171, 172, and 173 may have different diameters.

Since the first cooling tube 171 is responsible for the heat dissipation of the battery pack 131 of the first group including the largest number of battery packs, the first cooling tube 171 may be formed to have the largest diameter. For example, the first cooling tube 171 may have a diameter of 11 mm. The second cooling tube 172 is arranged at a position adjacent to the external connection tube 190 having a relatively high pressure while being responsible for the heat dissipation of the battery pack 132 of the second group including the smallest number of battery packs. For this reason, in order to limit the cooling flow rate to the second cooling tube 172, the second cooling tube 172 may be formed to have the smallest diameter.

More specifically, the first cooling tube 171 may include a flow path 171A passing through the rear branching portion 160 and a bypass flow path 171B bypassing the rear branching portion 160, along the flow path of the first cooling tube 171. In this case, the longest flow path 171A connected to the third cooling tube 173 through the rear branching portion 160, that is, the longest flow path 171A connected from the first cooling tube 171 to the third cooling tube 173, may be formed to have the largest diameter, for example, a diameter of 11 mm, to provide a relatively large flow rate. The bypass flow path 171B for bypassing the rear branching portion 160 along the flow path of the first cooling tube 171 may be formed to have a relatively small diameter, for example, a diameter of 9 mm, such that the flow rate of a cooling medium is more limited in the bypass flow path 171B than in the flow path 171A of the rear branching portion 160. That is, the bypass flow path 171B of the first cooling tube 171 has a smaller diameter than the flow path 171A of the rear branching portion 160, and thus, the first cooling tube 171 extends to the third cooling tube 173 and more flow may be allocated to the flow path 171A of the rear branching portion 160 having a relatively large heat dissipation demand. In particular, since the diameter of the flow path 171A of the first cooling tube 171, which extends to the third cooling tube 173 arranged at the farthest distance from the external connection tube 190, is relatively large, a flow resistance and a pressure drop may be reduced along the flow of a cooling medium and thus a proper flow rate may be secured.

The second cooling tube 172 is arranged at a position adjacent to the external connection tube 190 having a relatively high pressure while being responsible for the heat dissipation of the battery pack 132 of the second group including the smallest number of battery packs. For this reason, in order to limit the cooling flow rate to the second cooling tube 172, the second cooling tube 172 may be formed to have the smallest diameter. For example, the second cooling tube 172 may be formed to have a diameter of 6 mm.

Referring to FIG. 8, an upper portion of the first cooling plate 121 having the first cooling tube 171 embedded therein may have a flat shape, and a lower portion of the first cooling plate 121 may have a convexly protruding shape according to the shape of the first cooling tube 171. This structure stably supports the battery pack 131 of the first group through the flat upper surface of the first cooling plate 121 while forming sufficient thermal contact with the battery pack 131 of the first group. In addition, since the lower surface of the first cooling plate 121 is formed in a convexly protruding shape along the outer periphery of the first cooling tube 171, the first cooling tube 171 may be sufficiently embedded and a region where the first cooling tube 171 is not formed may have a small thickness, and thus, the cost of materials and the weight of the entire battery module may be reduced. For example, a lower portion of the first cooling tube 171 may be formed in the shape of surrounding the first cooling tube 171 along the shape of a mold (not shown) in the process of forming the first cooling plate 121.

Each of the first to third cooling tubes 171, 172, and 173 may include a plurality of tubular bodies. For example, the first to third cooling tubes 171, 172, and 173 may include a plurality of tubular bodies extending parallel to each other to evenly distribute a cooling medium over the entire areas of the first to third cooling plates 121, 122, and 123, in order to achieve a uniform heat dissipation effect over the entire areas of the first to third cooling plates 121, 122, and 123 where the battery packs 131, 132, and 133 are supported. In addition, the first to third cooling tubes 171, 172, and 173 may include a plurality of tubular bodies to form a circulation flow path including an inflow path from the external connection tube 190 and an outflow path toward the external connection tube 190. In this case, a fixing block 180 may be formed between adjacent tubular bodies extending parallel to each other to form the first to third cooling tubes 171, 172, and 173.

The fixed block 180 may function to bundle adjacent tubular bodies into one bundle, to maintain a constant interval therebetween, and to support the tubular bodies relative to each other. In particular, in the process of forming the first to third cooling plates 121, 122, and 123 in which the first to third cooling tubes 171, 172 and 173 are integrally formed, the fixing block 180 may function as a jig that keeps the first to third cooling tubes 171, 172, and 173 at a predetermined position against the flow of molten metal. More specifically, the first to third cooling tubes 171, 172, and 173 need to be temporarily fixed in a mold (not shown) for forming the first to third cooling plates 121, 122, and 123, and by injecting molten metal into a mold in which the first to third cooling tubes 171, 172, and 173 are temporarily fixed, the first to third cooling plates 121, 122, and 123 in which the first to third cooling tubes 171, 172, and 173 are integrally formed may be formed. In order to keep a plurality of tubular bodies of the first to third cooling tubes 171, 172, and 173 at a predetermined position against the pressure of molten metal injected at a high pressure, the fixing block 180 may connect the plurality of tubular bodies and keep the plurality of tubular bodies at a correct position.

For example, by accommodating a plurality of tubular bodies bounded by the fixing block 180 in a mold (not shown) for forming the first to third cooling plates 121, 122, and 123 and pressing an upper portion of the fixing block 180 through a fixing jig (not shown), the position of the fixing block 180 may be fixed and the plurality of tubular bodies may be fixed through the fixing block 180 so as not to move in the mold (not shown). In other words, the fixing block 180 may fix a plurality of tubular bodies for forming the first to third cooling tubes 171, 172, and 173 to each other and provide a pressing point at which an external fixing jig (not shown) may provide a predetermined pressure, and thus, the positions of the first to third cooling tubes 171, 172, and 173 may be fixed such that the first to third cooling tubes 171, 172, and 173 are formed at uniform depths in the first to third cooling plates 121, 122, and 123 and do not protrude to the outside. In this case, since the fixing block 180 provides a pressing point of the external fixing jig (not shown) and also maintains contact with the external fixing jig (not shown) even when molten metal is injected, the fixing block 180 may be exposed to at least one of the upper surface and the lower surface of each of the first to third cooling plates 121, 122, and 123 having completed forms.

The fixing block 180 may be embedded in the first to third cooling plates 121, 122, and 123 while being embedded in the molten metal. The fixing block 180 may include the same metal material as the first to third cooling plates 121, 122, and 123. For example, the fixing block 180 may include the same aluminum material as the first to third cooling plates 121, 122 and 123. That is, the fixing block 180 may be tightly coupled with the first to third cooling plates 121, 122, and 123 without a defect such as a crack in the process in which the fixing block 180 is embedded in an aluminum molten metal for forming the first to third cooling plates 121, 122, and 123 and is cooled and hardened. For example, the fixed block 180 and the first to third cooling plates 121, 122, and 123, which include the same material and have the same material characteristics, may be in close contact with each other during the cooling and hardening process to thereby form a rigid coupling.

The fixing block 180 may include an upper unit 181 and a lower unit 182 which are coupled to face each other with a first cooling tube 171 therebetween, and may further include a coupling unit 183 for coupling the upper unit 181 and the lower unit 182 together.

Hereinafter, a leakage blocking structure of the front and rear branching portions 150 and 160 is described. The leakage blocking of the front and rear branching portions 150 and 160 may denote preventing the leakage of the front and rear branching portions 150 and 160 from penetrating into the battery packs 131, 132, and 133. The front branching portion 150 is a portion where the first and second cooling tubes 171 and 172 are connected to the external connection tube 190, and the risk of leakage is relatively high in the front branching portion 150. In addition, the rear branching portion 160 is a portion where the first and third cooling tubes 171 and 173 are connected to each other, and the risk of leakage is relatively high in the rear branching portion 160.

The front branching portion 150 may includes a first lower branching block 151 formed at the first level h1, a first upper branching block 152 formed at the second level h2, and a first connection portion 153 connecting the first lower branching block 151 to the first upper branching block 152. In this case, the first lower branching block 151 and the first upper branching block 152 may be embedded in the first cooling plate 121 and the second cooling plate 122, respectively. That is, as well as with the first cooling tube 171, the first lower branching block 151 may be embedded in the first cooling plate 121, and as well as with the second cooling tube 172, the first upper branching block 152 may be embedded in the second cooling plate 122. In this case, the first lower branching block 151 and the first upper branching block 152 may be embedded in the first and second cooling plates 121 and 122 and completely surrounded by the first and second cooling plates 121 and 122. Thus, the leakage of the first lower branching block 151 and the first upper branching block 152 may be prevented and the leakage may be blocked from penetrating into the battery pack 131, 132, and 133.

The rear branching portion 160 may include a second lower branching block 161 formed at the first level h1, a second upper branching block 162 formed at the third level h2, and a second connection portion 163 connecting the first upper branching block 161 to the second upper branching block 162. In this case, the second lower branching block 161 and the second upper branching block 162 may be embedded in the first cooling plate 121 and the third cooling plate 123, respectively. That is, as well as with the first cooling tube 171, the second lower branching block 161 may be embedded in the first cooling plate 121, and as well as with the third cooling tube 173, the second upper branching block 162 may be embedded in the third cooling plate 123. In this case, the second lower branching block 161 and the second upper branching block 162 may be embedded in the first and third cooling plates 121 and 123 and completely surrounded by the first and third cooling plates 121 and 123. Thus, the leakage of the second lower branching block 161 and the second upper branching block 162 may be prevented and the leakage may be blocked from penetrating into the battery packs 131, 132, and 133.

The second connection portion 163 may include a second lower connection tube 163A, a second connection member (not shown), and a second upper connection tube 163B, similar to the first connection portion 153 to be described below. In this case, the second lower connection tube 163A, the second connection member, and the second upper connection tube 163B are formed to be the same as or similar to a first lower connection tube (not shown), a first connection member (not shown), and a first upper coupling tube (not shown), which are to be described below, and thus, detailed descriptions thereof are omitted.

In another embodiment, the rear branching portion 160 may include a second lower branching block 161, a second connection portion 163, and a second upper branching block 162. In this case, the second lower branching block 161 and the second upper branching block 162 are the same as or similar to those described above, and thus, detailed descriptions thereof are omitted.

The second connection portion 163 may have a double sealing structure. The second connection portion 163 may include a second lower connection tube 163A connected from the first cooling tube 171, a second upper connection tube 163B connected from the third cooling tube 173, and a second connection block 163C connecting the second lower connection tube 163A to the second upper connection tube 163B. In this case, the second connection block 163C may couple the second lower connection tube 163A and the second upper connection tube 163B together while surrounding the outer circumferences thereof, and a sealing member (not shown) may be interposed between the inner circumference of the second connection block 163C and the outer circumferences of the second lower connection tube 163A and the second upper connection tube 163B. More specifically, two sealing members may be superposed between the inner circumference of the second connection block 163C and the outer circumference of the second lower connection tube 163A and thus a double sealing structure may be applied therebetween. Likewise, two sealing members may be superimposed between the inner circumference of the second connection block 163C and the outer circumference of the second upper connection tube 163B and thus a double sealing structure may be applied therebetween. The sealing members may include an elastic material surrounding the outer circumferences of the second lower connection tube 163A and the second upper connection tube 163B, and may include a rubber material such as an O-ring.

Hereinafter, for convenience of description, the rear branching portion 160 is be described in detail with reference to a case where the second connection portion 163 is formed as a double sealing structure.

The external connection tube 190, the first cooling tube 171, and the first connection portion 153 may be connected to the first lower branching block 151 of the front branching portion 150. In this case, brazing coupling may be applied between the first lower branching block 151 and the external connection tube 190, between the first lower branching block 151 and the first cooling tube 171, and between the first lower branching block 151 and the first connection portion 153. Similarly, the brazing coupling may be applied to the first lower branching block 151 of the front branching portion 150. In the first lower branching block 151 and the first upper branching block 152 to which a plurality of tubular bodies are connected, the brazing coupling may be applied between the first lower and upper branching blocks 151 and 152 and the plurality of tubular bodies, and thus, leakage between the first lower and upper branching blocks 151 and 152 and the plurality of tubular bodies may be prevented.

A leakage-free fluid connection may be formed in the front branching portion 150 through the brazing coupling, and a double sealing structure may be applied to the rear branching portion 160 to thereby form a leakage-free fluid connection. In this case, unlike an integral coupling such as brazing, even if a double sealing structure is applied to the rear branching portion 160, there is a possibility of leaking according to the pressure of a cooling medium. For example, in the rear branching portion 160, the first cooling plate 121 (or the first cooling tube 171) and the third cooling plate 123 (or the third cooling tube 173) may be detachably connected to each other to improve the assembly properties of the entire battery module. In this case, even if a double sealing structure is applied for an airtight connection, the possibility of leakage may be higher than in an integral coupling such as a brazing coupling.

For the above reasons, a drain hole (not shown) may be formed around the rear branching portion 160. For example, the drain hole may be formed in the first cooling plate 121 under the rear branching portion 160. Even if a leakage occurs around the rear branching portion 160, more specifically, around the second connection block 163C of the rear branching portion 160, the leakage may be discharged to the outside through the drain hole of the first cooling plate 121 and the penetration of the leakage into the battery packs 131, 132, and 133 may be prevented. For example, the drain hole may be formed as a through hole passing through the first cooling plate 121.

Hereinafter, the first connection portion 153 is described in detail.

Figure 9:
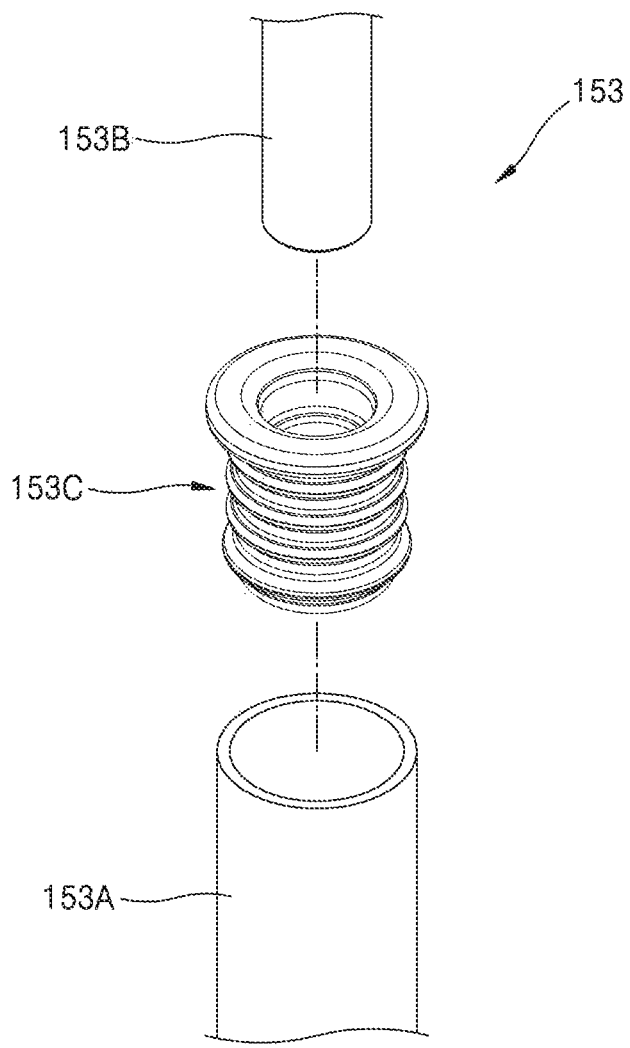
FIG. 9 is an exploded perspective view of a first connection portion shown in FIG. 6.
Figure 10:
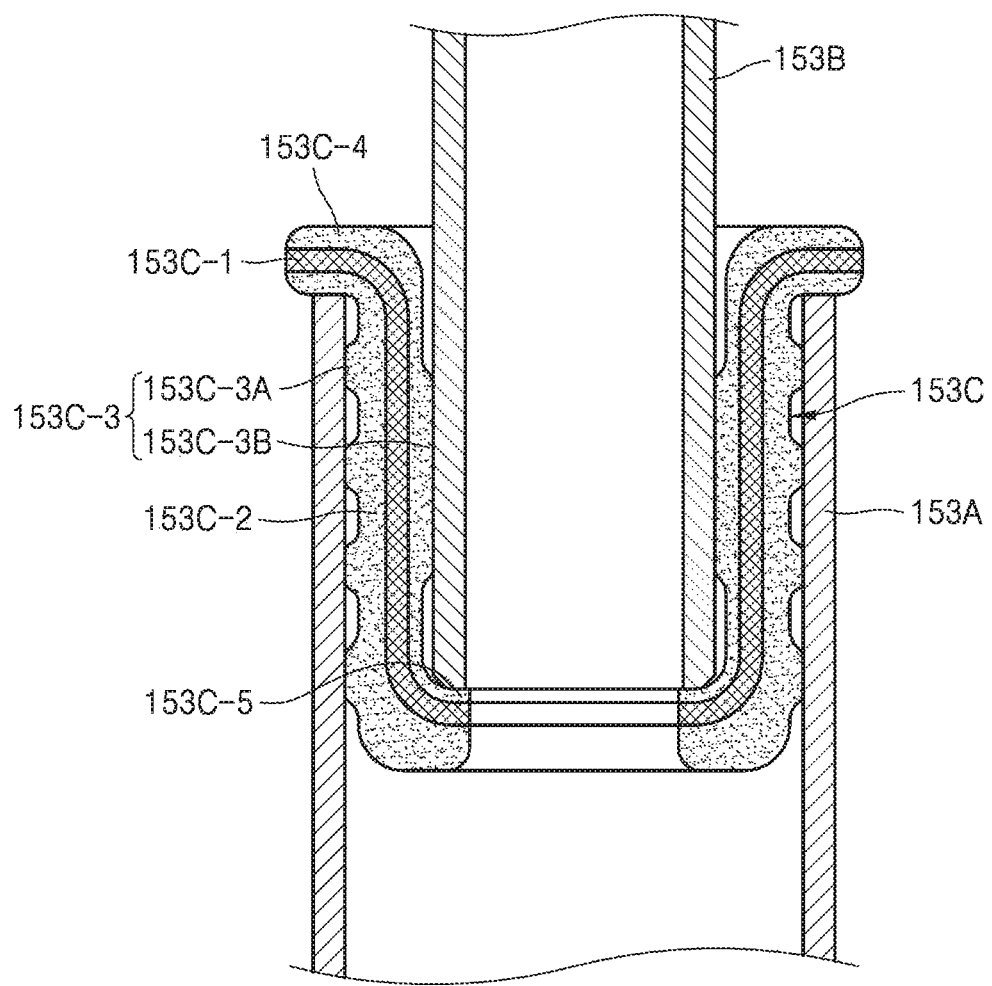
FIG. 10 is a cross-sectional view showing a coupling relationship of the first connection portion shown in FIG. 9.

FIG. 9 is an exploded perspective view of the first connection portion 153 shown in FIG. 6, and FIG. 10 is a cross-sectional view showing a coupling relationship of the first connection portion 153 shown in FIG. 9.

Referring to FIGS. 9 and 10, the first connection portion 153 may include a first lower connection tube 153A, a first upper connection tube 153B, and a first connection member 153C. The first lower connection tube 153A may be connected to the first cooling tube 171 and the external connection tube 190. In this case, the first lower connection tube 153A may be connected to the first cooling tube 171 and the external connection tube 190 through the first lower branching block 151. The first upper connection tube 153B may be connected to the first lower connection tube 153A and the second cooling tube 172 through the first connection member 153C. In this case, the first upper connection tube 153B may be connected to the second cooling tube 172 through the first upper branching block 152. The first connection member 153C may be arranged between the first lower connection tube 153A and the first upper connection tube 153B to connect the first lower connection tube 153A to the first upper connection tube 153B. In this case, the first connection member 153C may be inserted into one of the first lower connection tube 153A and the first upper connection tube 153B. In addition, the other one of the first lower connection tube 153A and the first upper connection tube 153B may be inserted into the first connection member 153C. In this case, the outer diameter of one of the first lower connection tube 153A and the first upper connection tube 153B may be less than the inner diameter of the other one of the first lower connection tube 153A and the first upper connection tube 153B. Hereinafter, for convenience of description, the case where the inner diameter of the first lower connection tube 153A is greater than the outer diameter of the first upper connection tube 153B is mainly described. Hereinafter, the first connection member 153C is described in detail.

The first connection member 153C may include a first core member 153C-1 and a first outer cover member 153C-2. In this case, the hardness of the first core member 153C-1 may be different from the hardness of the first outer cover member 153C-2. For example, the first core member 153C-1 may include a metal material, and the first outer cover member 153C-2 may include an elastic material such as silicone, rubber, or the like. In this case, the first outer cover member 153C-2 may be deformed when the first connection member 153C, the first lower connection tube 153A, or the first upper connection tube 153B is installed, thereby improving the assembly properties.

The first core member 153C-1 may have an inner space formed therein. In this case, one end of the first core member 153C-1 may be bent into the inner space, and the other end of the first core member 153C-1 may protrude to the outer circumferential surface of the first core member 153C-1.

The first outer cover member 153C-2 may be arranged to completely surround the first core member 153C-1. In this case, the first outer cover member 153C-2 may include a first protrusion 153C-3 protruding from at least one of the outer surface and the inner surface of the first outer cover member 153C-2. The first protrusion 153C-3 may be arranged between the first outer cover member 153C-2 and the first lower connection tube 153A or between the first outer cover member 153C-2 and the first upper connection tube 153B and seal a space between the first lower connection tube 153A and the first connection member 153C or between the first upper connection tube 153B and the first connection member 153C.

The first protrusion 153C-3 may include a first outer protrusion 153C-3A and a first inner protrusion 153C-3B. The first outer protrusion 153C-3A may be formed on the outer surface of the first outer cover member 153C-2 and arranged between the first outer cover member 153C-2 and the first lower connection tube 153A. The first inner protrusion 153C-3B may be formed on the inner surface of the first outer cover member 153C-2 and arranged between the first outer cover member 153C-2 and the first upper connection tube 153B.

At least one of the first outer protrusion 153C-3A and the first inner protrusion 153C-3B may include a plurality of protrusions. Hereinafter, for convenience of description, the case where the first outer protrusion 153C-3A includes a plurality of protrusions and the first inner protrusion 153C-3B includes only one protrusion is mainly described in detail. When the first outer protrusion 153C-3A includes a plurality of protrusions, the plurality of protrusions may be spaced apart from each other in a longitudinal direction of the first outer cover member 153C-2.

At least one of the first outer protrusion 153C-3A and the first inner protrusion 153C-3B may encircle the outer circumferential surface of the first outer cover member 153C-2. In this case, at least one of the first outer protrusion 153C-3A and the first inner protrusion 153C-3B may form a closed loop on the outer circumferential surface of the first outer cover member 153C-2. In another embodiment, at least one of the first outer protrusion 153C-3A and the first inner protrusion 153C-3B may include a plurality of protrusions along the outer circumferential surface of the first outer cover member 153C-2. In this case, at least one of the first outer protrusion 153C-3A and the first inner protrusion 153C-3B may be arranged on the outer circumferential surface of the first outer cover member 153C-2 such that the plurality of protrusions are spaced apart from each other. Hereinafter, for convenience of description, the case where at least one of the first outer protrusion 153C-3A and the first inner protrusion 153C-3B forms a closed loop on the outer circumferential surface of the first outer cover member 153C-2 is mainly described in detail.

When assembling the first connection portion 153, the first connection member 153C may be inserted into the first lower connection tube 153A. In this case, the first connection member 153C may be tightly coupled to the inside of the first lower connection tube 153A. In particular, the first outer protrusion 153C-3A may be completely in contact with the inner surface of the first lower connection tube 153A. A portion of the first core member 153C-1 bent at the other end thereof may form a first latching portion 153C-4 and be seated at one end of the first lower connection tube 153A. In particular, since the outer diameter of the first latching portion 153C-4 is greater than the outer diameter of the first lower connection tube 153A, the end of the first lower connection tube 153A may be caught by the first latching portion 153C-4.

In addition, the first upper connection tube 153B may be inserted into the first connection member 153C. In this case, the first upper connection tube 153B may be in contact with the first inner protrusion 153C-3B in the first connection member 153C. In this case, the first upper connection tube 153B may be tightly coupled with the first connection member 153C due to the first inner protrusion 153C-3B. In particular, when the first upper connection tube 153B is inserted into the first connection member 153C, when the first latching portion 153C-4 contacts the first lower connection tube 153A, the first connection member 153C may not continuously enter the first lower connection tube 153A. In addition, when the first upper connection tube 153B is inserted into the first connection member 153C, one end of the first upper connection tube 153B may contact a first seating portion 153C-5 protruding to the inside of the first connection member 153C. In this case, the first upper connection tube 153B may not continuously move within the first connection member 153C and the position of the first upper connection tube 153B may be fixed.

When the first lower connection tube 153A, the first connection member 153C, and the first upper connection tube 153B are coupled to each other as described above, the first lower connection tube 153A, the first connection member 153C, and the first upper connection tube 153B may not be separated from each other without a separate member through the first outer protrusion 153C-3A and the first inner protrusion 153C. Since the first outer protrusion 153C-3A is completely in close contact with the inner surface of the first lower connection tube 153A and the first inner protrusion 153C-3B is completely in contact with the outer surface of the first upper connection tube 153B, a space between the outer surface of the first connection member 153C and the inner surface of the first lower connection tube 153A and a space between the inner surface of the first connection member 153C and the outer surface of the first upper connection tube 153B may be completely sealed.

Thus, in the battery module 100, the first cooling tube 171 and the second cooling tube 172 may be simply connected to each other through the first connection member 153C. In addition, a leakage, which may occur after the first cooling tube 171 and the second cooling tube 172 are connected to each other through the first connection member 153C, may be prevented, and thus, the life of the battery module may be prolonged and the stability thereof may increase.

While preferred embodiments of the present disclosure have been described, various changes or modifications may be made therein without departing from the spirit and scope of the present disclosure. Accordingly, the appended claims cover all such changes and modifications falling within the spirit and scope of the present disclosure.

INDUSTRIAL APPLICABILITY

Embodiments of the present disclosure provide battery modules capable of connecting cooling tubes with a simple structure, and the battery modules may be used in electric vehicles, hybrid vehicles, hybrid ships, electric bicycles, mobile devices, etc.

The invention claimed is:

1. A battery module comprising:
a first cooling tube;
a second cooling tube connected to the first cooling tube and arranged on a different plane than the first cooling tube is arranged on; and
a branching portion connecting the first cooling tube to the second cooling tube,
wherein the branching portion comprises:
a lower connection tube connected to the first cooling tube;
an upper connection tube connected to the second cooling tube; and
a connection member into which one of the lower connection tube and the upper connection tube is inserted, the connection member being inserted into the other of the lower connection tube and the upper connection tube.

2. The battery module of claim 1, wherein the connection member comprises:
a protrusion protruding toward the lower connection tube or the upper connection tube.

3. The battery module of claim 2, wherein the protrusion comprises:
an outer protrusion protruding toward one of the lower connection tube and the upper connection tube; and
an inner protrusion protruding toward the other of the lower connection tube and the upper connection tube.

4. The battery module of claim 2, wherein the protrusion comprises a plurality of protrusions, wherein the plurality of protrusions are spaced apart from each other.

5. The battery module of claim 2, wherein the protrusion encircles an outer surface of the connection member to form a closed loop.

6. The battery module of claim 1, wherein the connection member comprises:
a core member; and
an outer cover member surrounding an outer surface of the core member.

7. The battery module of claim 6, wherein hardness of the core member is different from hardness of the outer cover member.

8. The battery module of claim 1, wherein the connection member comprises:
a seating portion supporting an end of one of the lower connection tube and the upper connection tube; and
a latching portion latched to an end of the other of the lower connection tube and the upper connection tube.

9. The battery module of claim 1, further comprising:
a lower branching block arranged between the first cooling tube and the lower connection tube.

10. The battery module of claim 1, further comprising:
an upper branching block arranged between the second cooling tube and the upper connection tube.

11. The battery module of claim 1, further comprising:
a first cooling plate in which the first cooling tube is arranged.

12. The battery module of claim 1, further comprising:
a second cooling plate in which the second cooling tube is arranged.

13. The battery module of claim 1, wherein the connection member is tightly coupled with the lower connection tube or the upper connection tube.

14. The battery module of claim 1, further comprising:
a third cooling tube connected to the first cooling tube and arranged on a different plane than the first cooling tube is arranged on to form a certain angle with the first cooling tube.

15. The battery module of claim 14, further comprising:
a third cooling plate in which the third cooling tube is arranged.

* * * * *